US009099108B2

(12) United States Patent
Meloche et al.

(10) Patent No.: US 9,099,108 B2
(45) Date of Patent: Aug. 4, 2015

(54) MAGNETICALLY BIASED WRITE POLE

(75) Inventors: Eric Roger Meloche, Burnsville, MN (US); Jianhua Xue, Maple Grove, MN (US); Eric Linville, Shakopee, MN (US); Huaqing Yin, Eden Prairie, MN (US); Zhiran Wang, Londonderry (IE); Frank A. McGinnity, Eglinton (IE); Robert William Lamberton, Limavady (IE)

(73) Assignee: Seagate Technology LLC, Cupertino, CA (US)

( * ) Notice: Subject to any disclaimer, the term of this patent is extended or adjusted under 35 U.S.C. 154(b) by 345 days.

(21) Appl. No.: 13/177,300

(22) Filed: Jul. 6, 2011

(65) Prior Publication Data

US 2013/0010386 A1 Jan. 10, 2013

(51) Int. Cl.
*G11B 5/127* (2006.01)
*G11B 5/31* (2006.01)
*G11B 5/00* (2006.01)

(52) U.S. Cl.
CPC ............ *G11B 5/3116* (2013.01); *G11B 5/3166* (2013.01); *G11B 2005/0008* (2013.01); *Y10T 29/49034* (2015.01)

(58) Field of Classification Search
CPC .. Y10T 29/49034; G11B 33/00; G11B 5/127; G11B 5/3116; G11B 5/3166; G11B 5/0008
USPC ............ 360/125.13, 125.14, 123.11, 125.02, 360/125.3, 123.58, 123.12
See application file for complete search history.

(56) References Cited

U.S. PATENT DOCUMENTS

| | | | | |
|---|---|---|---|---|
| 3,893,187 | A | 7/1975 | Kanai et al. | |
| 4,423,450 | A | 12/1983 | Hamilton | |
| 6,671,127 | B2 | 12/2003 | Hsu et al. | |
| 7,002,775 | B2 * | 2/2006 | Hsu et al. | 360/125.03 |
| 7,070,716 | B2 * | 7/2006 | Lam | 360/125.04 |
| 7,199,975 | B1 * | 4/2007 | Pan | 360/125.06 |
| 7,295,401 | B2 | 11/2007 | Jayasekara et al. | |
| 7,397,633 | B2 * | 7/2008 | Xue et al. | 360/125.3 |
| 7,576,950 | B2 | 8/2009 | Matono | |
| 8,116,032 | B2 * | 2/2012 | Contreras et al. | 360/123.02 |
| 2003/0039068 | A1 | 2/2003 | Crawford et al. | |
| 2005/0018347 | A1 | 1/2005 | Hsiao et al. | |
| 2008/0316631 | A1 | 12/2008 | Gao et al. | |
| 2010/0188775 | A1 * | 7/2010 | Macken et al. | 360/123.06 |
| 2010/0254042 | A1 * | 10/2010 | Contreras et al. | 360/123.05 |

OTHER PUBLICATIONS http://www.merriam-webster.com/dictionary/permanent+magnet?show=0&t=1395165530[Mar. 18, 2014 1:00:47 PM]; 1 pg.
http://dictionary.reference.com/browse/permanent+magnet?s=t&path=/; 1 pg.
http://en.wikipedia.org/wiki/Permanent_magnet; pp. 1-12.
B. D. Cullity and C. D. Graham, Introduction to Magnetic Materials, 2 ed., pp. 103, Wiley-IEEE Press.
Raymond A. Serway and Chris Vuille, Essentials of College Physics, Cengage Learning, pp. 493, Thomson Brooks/Cole, US.

* cited by examiner

*Primary Examiner* — Julie Anne Watko
(74) *Attorney, Agent, or Firm* — Hall Estill Attorneys at Law

(57) ABSTRACT

An apparatus may be constructed with a magnetic element, such as a data transducing head. A first permanent magnet may be configured to bias the write pole to decrease remnant magnetization and erasure after write (EAW). The first permanent magnet can be separated from the write pole be a predetermined distance.

19 Claims, 4 Drawing Sheets

MAGNETICALLY BIASED WRITE POLE

SUMMARY

In accordance with various embodiments, a first permanent magnet may be configured to bias the write pole to decrease remnant magnetization and erasure after write (EAW).

DETAILED DESCRIPTION

Industry demand for data storage devices with higher data capacity, transfer rates, and reliability has placed added emphasis on reducing the size of data bits while increasing data access rates from a data storage media. Such precise operational environments can increase the propensity for residual magnetic flux to inadvertently influence data bits. When residual magnetic flux is present after a data bit is programmed, an erase after write (EAW) situation may occur as an unpowered writer emits flux that erases data bits on an adjacent data media. Increased instances of EAW, especially in reduced form factor data storage devices, can degrade the data media and increase data access errors through erasure of operational data bits, such as servo data.

Accordingly, at least one permanent magnet ("means for biasing the write pole") may be separated from an air bearing surface (ABS) by a first predetermined distance and from a write pole by a second predetermined distance. The one or more permanent magnets may be configured to bias the write pole to decrease remnant magnetization and erasure after write (EAW). The configuration of the permanent magnet adjacent to and separated from at least the write pole and ABS allows for adjustment and tuning of the magnetic biasing experienced by the write pole. With such biasing of the write pole and tuning capability of the permanent magnet, the write pole can avoid metastable magnetic states that may increase risk for EAW situations.

Figure 1:
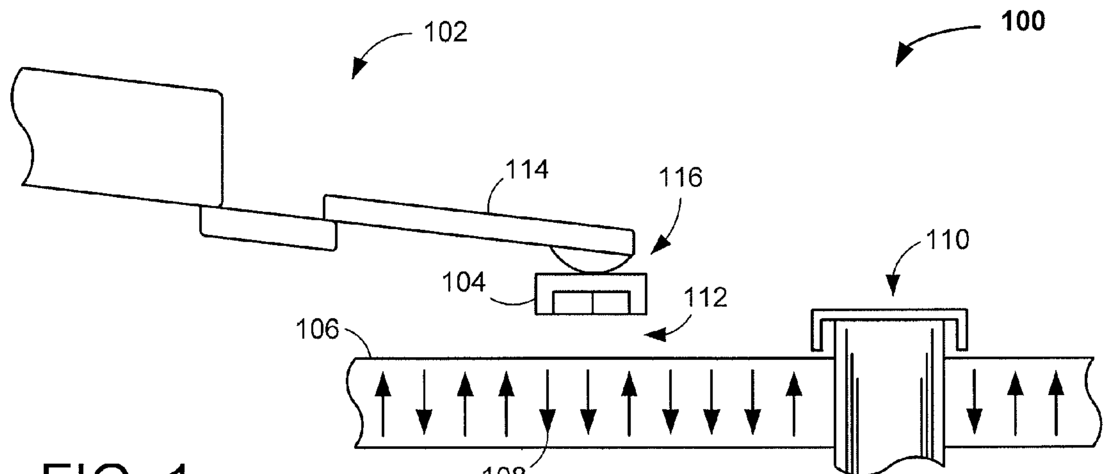
FIG. 1 is a block representation of an example portion of a data storage device.

While an EAW condition can occur in a variety of data storage environments, FIG. 1 generally illustrates an example data transducing portion 100 of a data storage device. The transducing portion 100 is shown in an environment in which various embodiments of the present invention can be advantageously practiced. It will be understood, however, that the claimed invention is not so limited by such environment and can be implemented to alleviate various inadvertent magnetic flux generation conditions.

The transducing portion 100 has an actuating assembly 102 that positions a transducing head 104 over a magnetic storage media 106 that is capable of storing programmed bits 108. The storage media 106 is attached to a spindle motor 110 that rotates during use to produce an air bearing surface (ABS) 112 on which a slider portion 114 of the actuating assembly 102 flies to position a head gimbal assembly (HGA) 116, which includes the transducing head 104, over a predetermined portion of the media 106.

The transducing head 104 can include one or more transducing elements, such as a magnetic writer and magnetically responsive reader, which operate to program and read data from the storage media 106, respectively. In this way, controlled motion of the actuating assembly 102 induces the transducers to align with data tracks (not shown) defined on the storage media surfaces to write, read, and rewrite data.

Figure 2:
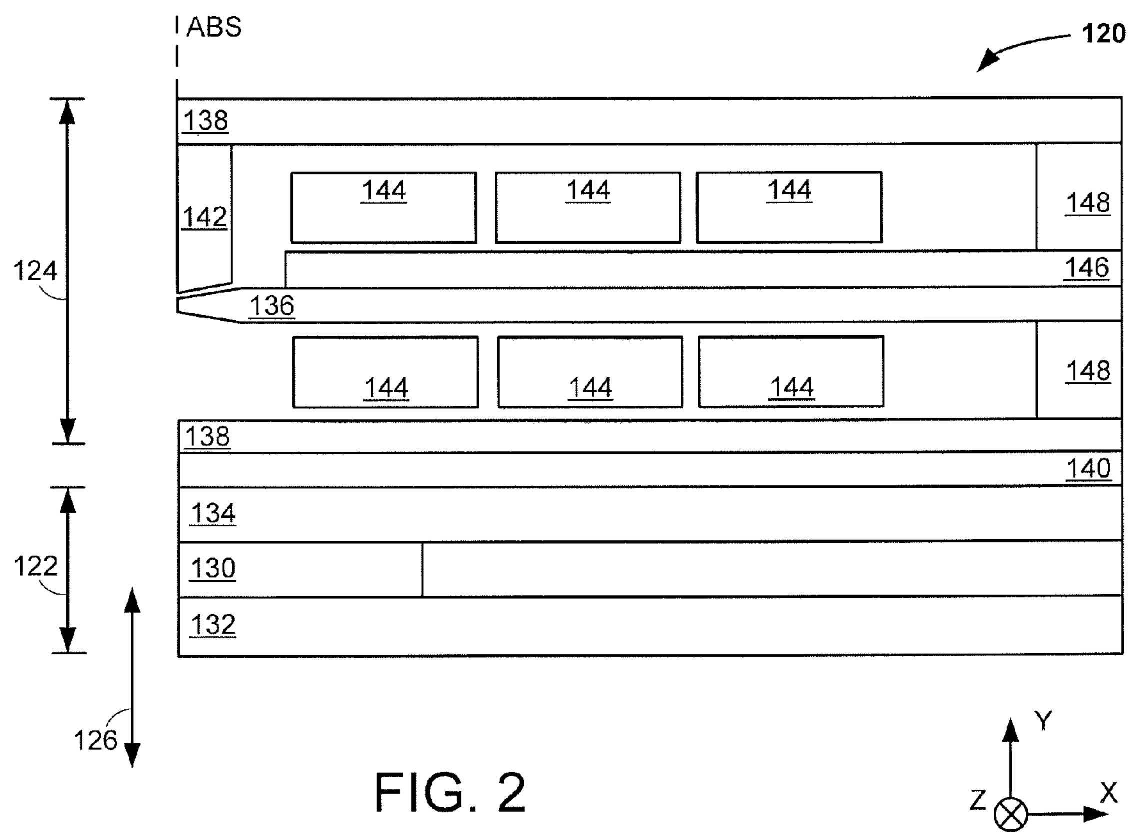
FIG. 2 generally illustrates an embodiment of a magnetic element capable of being used in the portion of the data storage device displayed in FIG. 1.

FIG. 2 displays a cross-sectional block representation of an embodiment of a transducing head 120 that is capable of being used in the actuating assembly of FIG. 1. The head 120 can have one or more magnetic elements, such as the magnetic reader 122 and writer 124, which can operate individually, or concurrently, to write data to, or retrieve data from, an adjacent storage media, such as media 106 of FIG. 1. Each magnetic element 122 and 124 is constructed of a variety of shields that act to define a predetermined data track 126 of the corresponding data media on which data bits are sensed and programmed by the respective magnetic elements 122 and 124.

The magnetic reading element 122, as shown, has a magnetoresistive layer 130 disposed between leading and trailing shields 132 and 134. Meanwhile, the writing element 124 has a write pole 136 and at least one return pole 138 that creates a writing circuit to impart a predetermined magnetic orientation to the adjacent storage media. While not limiting, some embodiments use the writing element 124 to write data perpendicularly to the adjacent data media. Such perpendicular recording can allow for more densely packed data bits, but can also increase the effect of EAW as multiple data bits are influence by residual magnetic flux.

In another non-limiting embodiment, the writing element 124 can include at least two return poles 138 positioned contactingly adjacent a non-magnetic spacer layer 140 and an air bearing surface (ABS) shield 142. The writing element 124 may further include a coil 144 that can be one or many individual wires and a yoke 146 that attaches to the write pole 136 and operates with the coil 144 to impart a magnetic flux that travels from the write pole 136 through conductive vias 148 to conclude at the return poles 138. It should be noted that the various aspects of the head 120 can be characterized as either uptrack or downtrack, along the Y axis, depending on the motion of the head.

In operation, the write and return poles 136 and 138 can channel magnetic flux to designated portions of an adjacent data medium to program a predetermined magnetic orientation. With ever increasing data recording speeds and magnetic flux intensities, the write pole 136 may have remnant magnetic flux after a magnetic orientation has been recorded. Such remnant magnetic flux can emanate from the write pole 136 to inadvertently program one or more data bits in an "erase after write" (EAW) condition. In view of the potential for an EAW, the head 120 may be equipped with one or more permanent magnets that magnetically bias the write pole 136 to control the relaxation of magnetization near the ABS immediately after the coil 144 ceases flux production.

Figure 3:
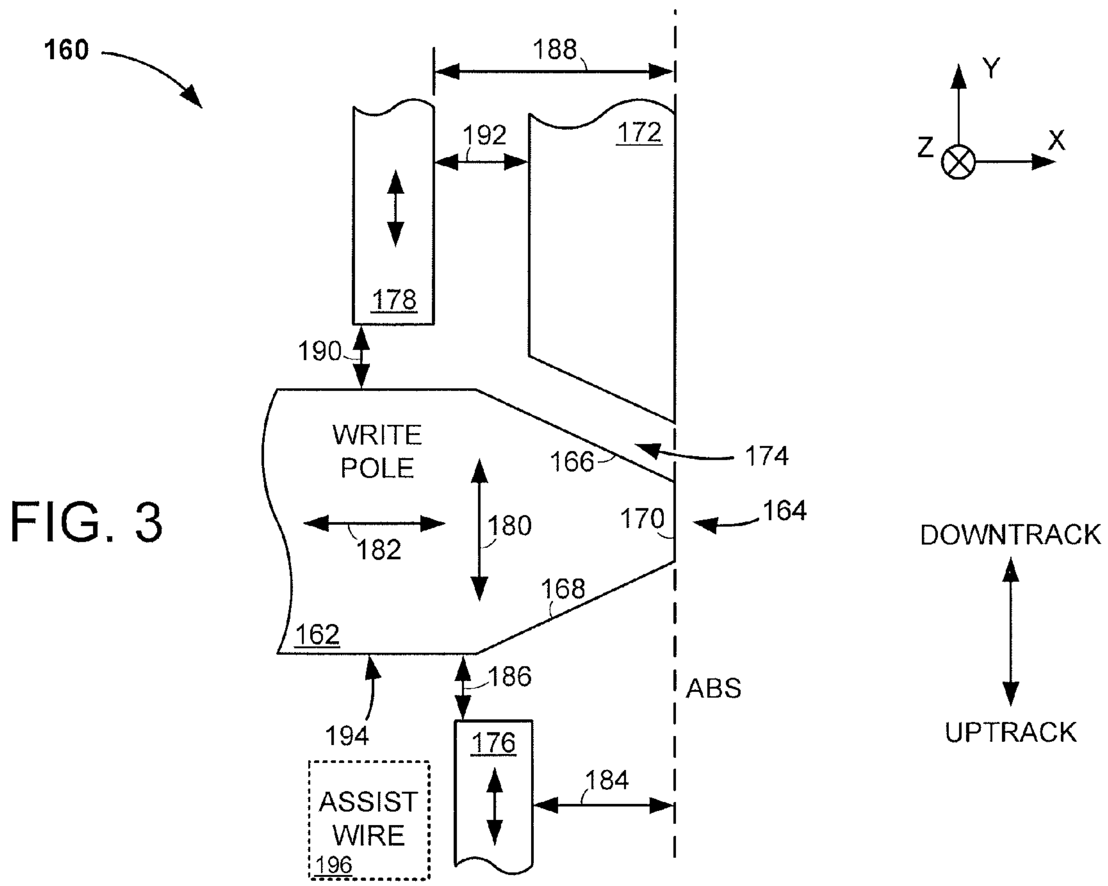
FIG. 3 shows a cross-section of a portion of the example magnetic element of FIG. 2.

An example implementation of permanent magnets into a writing element 160 is generally displayed in the cross-sectional representation of FIG. 3. It is to be understood that FIG. 3 is generally illustrated as aligned with a predetermined track where the bottom portion of the writing element 160 is uptrack and will encounter a magnetic bit before a downtrack portion at the top of the writing element 160. The writing element 160 has a write pole 162 with a tapered tip 164 comprised of first and second tip surfaces 166 and 168 each with predetermined taper angles that meet at an ABS tip surface 170 that is parallel to the ABS. A trailing shield 172 is also positioned on the ABS and adjacent the write pole 162 across a shield gap 174 that is configured with a predetermined length to shield flux from emanating from the write pole to adjacent data bits.

While the trailing shield 172 and tapered write pole tip 164 may have any number of different configurations that increase performance by decreasing magnetic shunting and undershoot, the orientation of first and second permanent magnets 176 and 178 adjacent to and separated from the write pole 162 and ABS can provide enhanced performance by controlling the magnetization of the write pole 162 when the write pole is unpowered. That is, the permanent magnets 176 and 178 may induce a magnetic bias field 180 on the write pole 162 that is substantially orthogonal to a programming write field 182. The magnetic bias field 180 generates at least one localized bias region in the write pole 162 that can prevent higher energy metastable magnetic states that can inadvertently affect adjacent data bits while the write pole 162 is not activated, hence creating an EAW condition.

As shown in FIG. 3, one or more permanent magnets 176 and 178 can be oriented on opposite sides of the write pole 162 with independent or common predetermined distances from the ABS and the write pole 162, respectively. As an example, the first permanent magnet 162 can be positioned a first predetermined distance 184 from the ABS and a second predetermined distance 186 from the write pole 162 while the second permanent magnet 178 is positioned third, fourth, and fifth predetermined distances 188, 190, and 192 from the ABS, write pole 162, and trailing shield 172, respectively. The ability to position the permanent magnets 176 and 178 in a variety of orientations with respect to the ABS, write pole 162 and trailing shield 172 allows for the induced magnetic bias field 180 to be tuned to produce optimized performance through the control of flux in the write pole 162 after the pole is no longer in powered operation.

The permanent magnets 176 and 178 can further be oriented, in some embodiments, to bias selected portions of the write pole 162. That is, the first permanent magnet 176 can be configured to bias one or more tip surfaces 166 and 168 of the tapered tip 164 while the second permanent magnet biases a non-tapered portion 194 of the write pole 162 that is orthogonal to the ABS. The variability and non-limiting permanent magnet predetermined distances 184, 186, 188, 190, and 192 provide the ability to adjust and tune the bias field 180 generated by magnets 176 and 178 to localize magnetization in the write pole 162 for enhanced magnetization relaxation and the pole's remnant configuration.

With the first and second permanent magnets 176 and 178 being configured different distances from the ABS and influencing different portions of the write pole 162 as shown in FIG. 3, the bias field 180 may have a larger downtrack component than in other permanent magnet configurations, such as when a single permanent magnet is used to influence the write pole 162. The larger downtrack bias field 180 component may then be used with a larger crosstrack field component to optimize overall write element 160 performance without sacrificing write field 182 strength and gradient.

It should be noted that the configuration of writing element 160, such as the permanent magnets 176 and 178, write pole 162, and trailing shield 172, is merely a non-limiting example that can be modified or omitted. One such modification could be the changing of the shape of the tapered portion 164 of the write pole 164. Another modification could be the inclusion of a leading shield uptrack from the write pole 162. Regardless of the components, the configuration of at least one permanent magnet 176 and 178 proximate to, but separated from, both the write pole 162 and ABS allows for adjustment and tuning that aids in reducing and eliminating EAW.

Another potential writing element 160 configuration can provide a magnet assist wire 196 positioned proximate to one or both magnets 176 and 178 to supply added magnetic strength to the bias field 180 upon activation. The addition of the assist wire 196 can further allow for the magnets 176 and 178 to potentially be soft magnets with conservative anisotropy, in some embodiments, which may control the bias field 180 more precisely without decreasing magnetic moment in the write pole 162. As an example, the assist wire 196 can be tuned through position adjustment in predetermined distances from the ABS, write pole 162, and magnets 176 and 178 to produce a saturation moment that may enhance downtrack bias field 180 component while improving programming field 182 gradient.

Furthermore, the addition of the assist wire can allow the influence of the magnets 176 and 178 on the write pole 162 to be minimized as strong permanent magnetization of the magnets is replaced by selective activation of the assist wire 196. The ability to effectively turn off the generation of the bias field 180 can additionally provide simplified construction of the writing element 160 as strong permanent magnet shielding is minimized.

Figure 4:
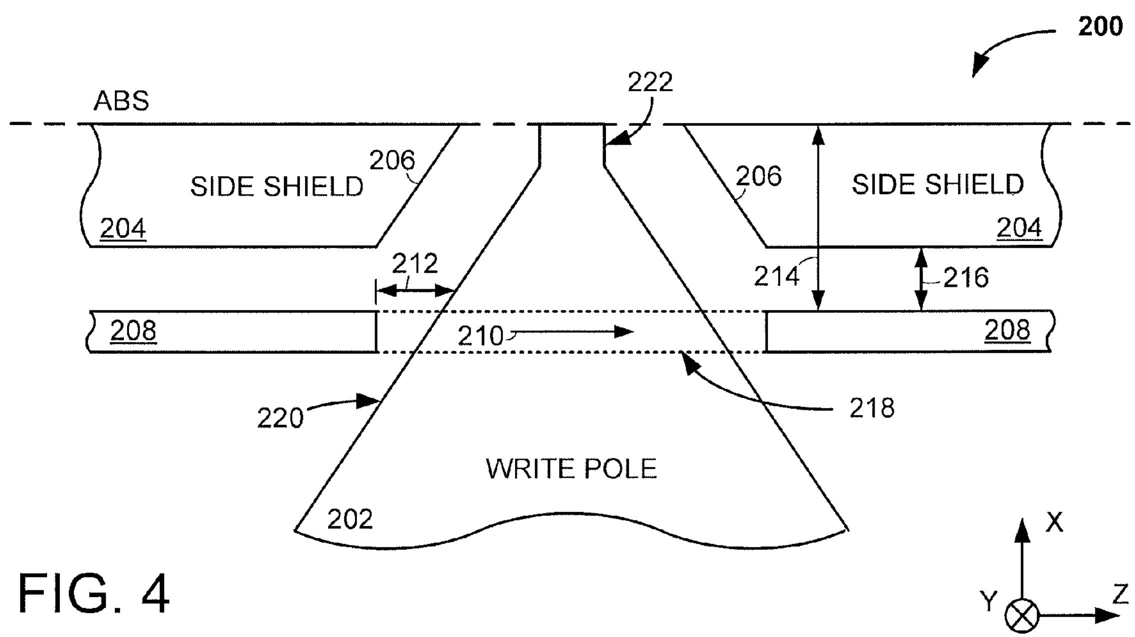
FIG. 4 displays an example top view of a portion of a magnetic element in accordance with various embodiments.

Turning to FIG. 4, a top view of another writing element 200 is generally illustrated as constructed in accordance with various embodiments. The element 200 has a write pole 202 disposed between side shields 204 that are each positioned on the ABS to prevent magnetic flux from reaching adjacent data tracks during operation. Each side shield 204 has a tapered write surface 206 that faces the write pole 202 to prevent magnetic shunting between the pole 202 and shields 204 that could reduce write field strength and overall performance.

The write pole 202 can have one or more permanent magnets 208 that generate a bias field 210 largely in the crosstrack direction, parallel to the ABS, across the write pole 202. With permanent magnets 208 separated by a first predetermined distance 212 from opposite sides of the write pole 202 and by second and third predetermined distances 214 and 216, respectively, from the ABS and side shield, the magnetostatic stray fields from the surface charges of the magnets 208 can generate a bias effect that is tunable with adjustment of the predetermined distances 212, 214, and 216.

In some embodiments, a single permanent magnet 218 continuously extends across the extent of the write pole 162 along the Z axis parallel to the ABS to generate the bias field 210, which further provides adjustment capabilities for optimizing write pole magnetization control. Various embodiments can further include the configuration of the write pole 202 and the permanent magnets 208 to generate the bias field 210 predominantly in a trapezoidal region 220, as opposed to a rectangular pole tip 222, which can allow the bias field 210 to control magnetization without adversely affecting write pole 202 performance.

Figure 5:
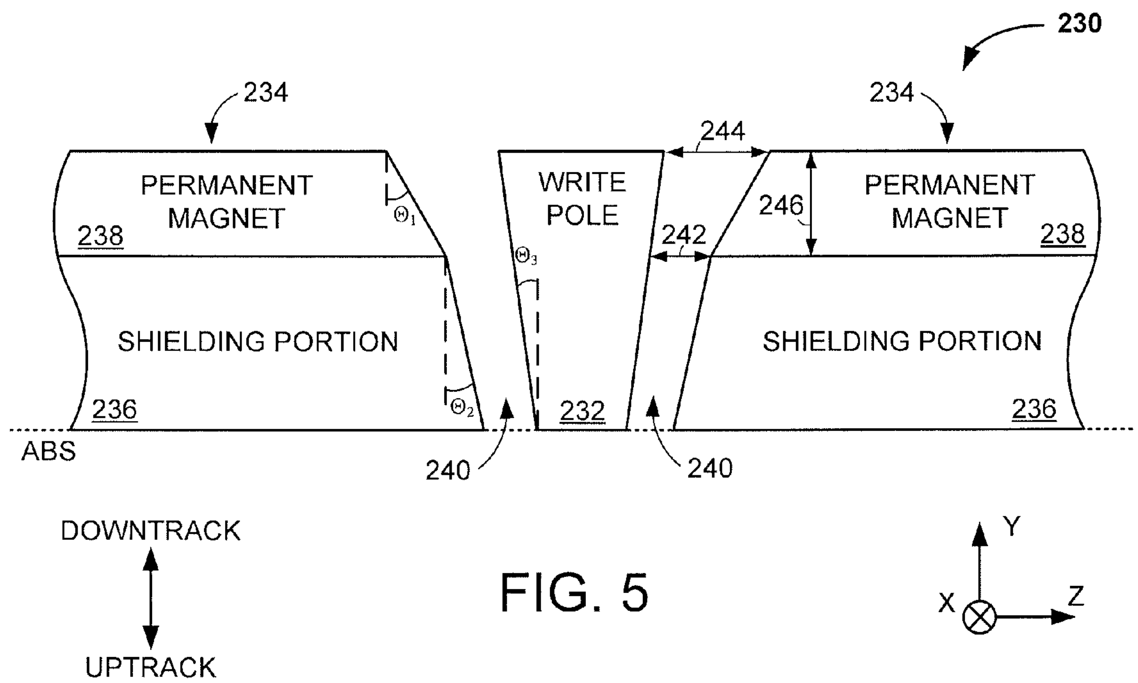
FIG. 5 illustrates a magnetic element embodiment as viewed from the ABS.

Yet another embodiment of a writing element 230 is displayed, as viewed from the ABS, in FIG. 5. The writing element 230 has a write pole 232 positioned between side laminations 234 that each have a shielding portion 236 and a permanent magnet portion 238. The lamination of the shield and permanent magnet portions may provide a bias field that induces write pole magnetization to align in-plane, along the permanent magnet magnetization, so that the write pole 232 has substantially a single magnetic domain when no write current is applied. However, the permanent magnet portions 238 can be configured so that any bias field does not degrade write pole programming field strength or gradient during powered operation.

Each side lamination 234 may be separated from the write pole 232 by a write gap 240 that is configured, as shown, with a tapered orientation where the shielding portion 236 is closer to the write pole 232 at the ABS than at a downtrack plane, such as plane 242. The increasing write gap width can be constructed by forming the write pole with a first continuous taper angle $\Theta_1$ that is less than a shield portion second continuous taper angle $\Theta_2$. Similarly, the permanent magnet portion 238 can be constructed with a third continuous taper angle $\Theta_3$ that further distances the side lamination 234 from the write pole 232 downtrack, along the Y axis, from plane 242 to plane 244. Such variable taper angles and write gap width provide additional ability to adjust and tune the influence of the side laminations 234 on the write pole 232.

The placement of the permanent magnet portion 238 onto the shielding portion 236 can exchange couple the magnetization of the permanent magnets to the soft shielding material and reduce risk of EAW as the magnetization of the write pole 232 matches the permanent magnet magnetization during quiescent write pole 232 conditions. It can be appreciated that the construction of the permanent magnet portion 238 directly onto the shielding portion 236 is not limited or required and may be modified with an intervening seed layer (not shown) that aids in the deposition of the permanent magnet material. The permanent magnet material is also not limited as a number of different elements, compounds, and alloys, such as ferrite, NdFeB, and rare earth metals, can be used to influence the write pole 232 with a bias field.

The continuous taper angle and unlimited adjustability of the permanent magnet portion 238 can be combined with an adjustable thickness 246 to provide bias field tuning that can accommodate a variety of operational conditions. For example, the permanent magnet portion 238 can be constructed with any combination of taper angles, distances from the ABS, and thicknesses to provide optimal biasing of the write pole to control quiescent magnetization. Adjustment of the permanent magnet portion thickness 246 may consider, in some instances, the stiffness of the bias field on the write pole 232 programming magnetization, which can restrict magnetization switching and pole performance.

Figure 6:
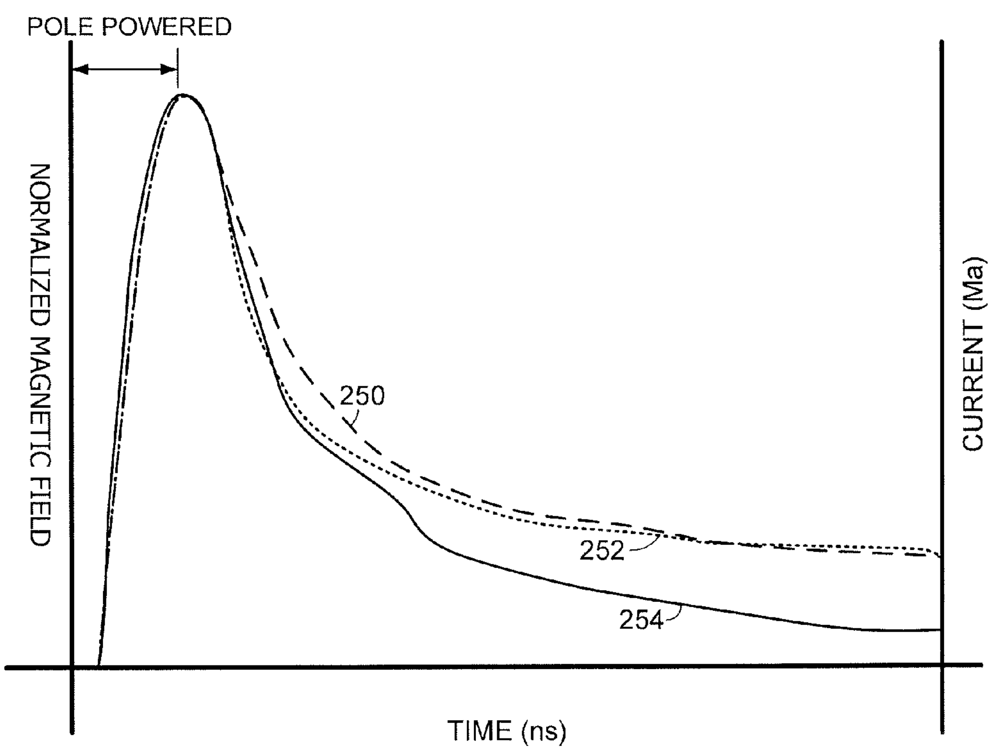
FIG. 6 graphs various operational characteristics of a magnetic element constructed and operated in accordance with various embodiments.

The various embodiments shown in FIGS. 3-5 can be modeled during design and manufacture to provide optimal tuning of the permanent magnets and generation of a bias field that significantly reduces risk of EAW and enhanced pole performance. FIG. 6 graphs example models of various writing element configurations to illustrate variations of normalized magnetic field of a write pole and current as a function of time resultant from permanent magnet tuning. Segmented line 250 plots an example writing element utilizing a solid write pole with no permanent magnet bias. Line 250 elevates to a large normalized magnetic field while the write pole is powered and retains an elevated level of magnetic field throughout the measured period. As discussed above, such elevated levels of magnetic field can correspond with increased risk of EAW to one or more data bits.

Segmented line 252 models a writing element with permanent magnets placed on opposite sides of the write pole with predetermined separation distances from the ABS, write pole, and shields, similar to writing element 200 of FIG. 4. Line 252 experiences an increased loss in magnetic field in relation to line 250 shortly after the pole becomes unpowered. Such a permanent magnet configuration and magnetic field dissipation can provide optimal performance in some environments. However, optimization of a writing element for reduction in EAW risk can correspond to solid line 254 that dissipates magnetic field significantly more than the configurations of either line 250 or 252. While any permanent magnet configuration can result in the performance modeled by line 254, one embodiment produces such magnetic field dissipation with a permanent magnet positioned at the leading, uptrack, edge of the write pole without a leading shield between the magnet and the ABS, such as shown by magnet 176 of FIG. 3.

Figure 7:
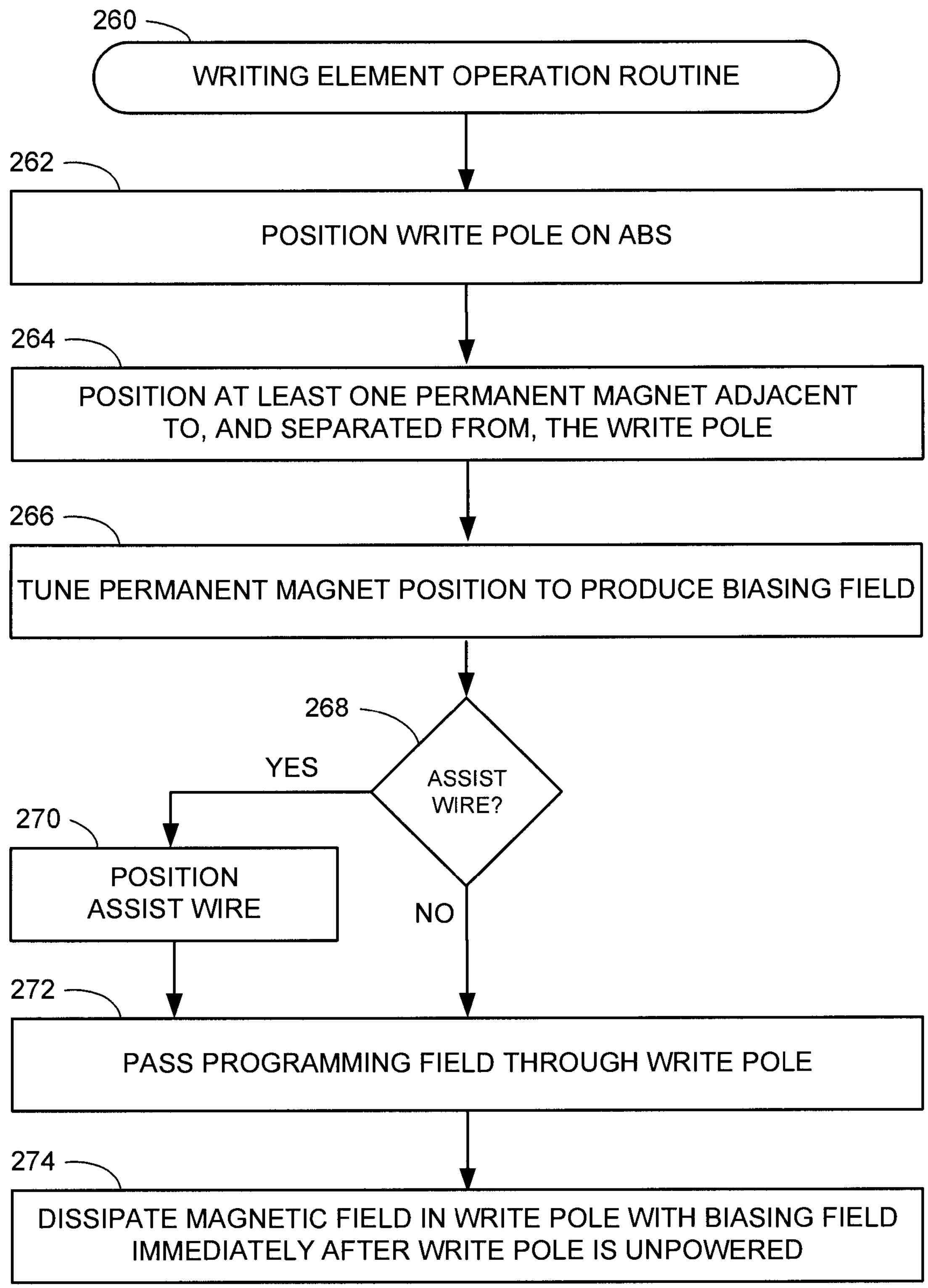
FIG. 7 provides a flowchart of a magnetic element fabrication routine conducted in accordance with various embodiments of the present invention.

These increases in dissipated ABS magnetic field from the write pole in the configurations of lines 252 and 254 can allow greater programming magnetic fields and field gradients to be used to perpendicularly write data to data storage media with increased data bit density. An example of the use of the modeled writing element embodiments in accordance with various embodiments of the present invention is provided in a writing element operation routine 260 of FIG. 7.

The routine 260 initially positions a write pole on the air bearing surface (ABS) in step 262. The write pole may have a number of supplemental components constructed or installed in step 262, such as magnetic shields. With at least the write pole formed on the ABS, step 264 positions at least one permanent magnet adjacent to, and separated from, the write pole. As discussed above, the one or more permanent magnets can be positioned a number of different distances and with respect to various portions of the write pole to provide predetermined operational performance.

As such, step 266 tunes the permanent magnet position to produce a bias field that meets predetermined criteria, such as magnetic field dissipation, programming field strength, and programming field gradient. It can be appreciated that the tuning of the permanent magnet position can be done with the aid of operational modeling that allows various magnet orientations to be evaluated for performance. With the permanent magnet installed in predetermined locations, the routine 260 determines in decision 268 if an assist wire is to be installed adjacent the permanent magnet. An assist magnet can provide heightened bias field generation, as previously discussed, and is positioned at a predetermined location in step 270 if decision 268 calls for such.

In the event decision 268 does not request an assist wire, step 272 proceeds to pass a programming field through the write pole to conduct data bit access on an adjacent data storage media. With the programming field being minimally influenced by any bias field from the permanent magnet, the write pole can accurately and quickly set the data bit due to increased field strength and gradient. Immediately following the write pole being powered, the programming field is dissipated from the ABS by the bias field created by the permanent magnet. The tuned position and operation of the permanent magnet allows for the programming field to be rapidly decreased, with corresponds to a minimized risk of EAW.

Through controlled operation, steps 272 and 274 can be cycled an unlimited number of times to program data and immediately dissipate programming fields at the ABS of the write pole. However, the routine 260 is not limited to the process shown in FIG. 7 as the various decisions and steps can be omitted, changed, and added. For example, steps 264 and 266 can be reversed as the permanent magnet can be tuned for performance before being positioned adjacent the write pole.

Throughout the present disclosure, various aspects have been labeled "permanent magnets." Such nomenclature can be characterized synonymously with "means for biasing the write pole."

The "permanent magnet moniker is merely an example of possible material and operational characteristics and by no way limits the possible construction and application of the various embodiments. However, some embodiments utilize permanent magnets that have high anisotropy, are magnetically hard materials, and have persistent magnetic fields.

It can be appreciated that the configuration and material characteristics of the magnetic element described in the present disclosure may allow for enhanced magnetic programming through reduction of erasure after writing. Positioning a permanent magnet adjacent the write pole can allow for the generation of a bias field that dissipates remnant programming fields from the ABS immediately after the write pole is unpowered. Moreover, an ability to tune and optimize the configuration of the permanent magnet provides increased bias field precision that can conform to a variety of performance characteristics. In addition, while the embodiments have been directed to magnetic sensing, it will be appreciated that the claimed invention can readily be utilized in any number of other applications, including data storage device applications.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application without departing from the spirit and scope of the present invention.

What is claimed is:

1. An apparatus comprising a first magnetically hard material separated from an air bearing surface (ABS) by a first non-zero distance and from a write pole by a second non-zero distance, a second magnetically hard material separated from the ABS, first magnetically hard material, and write pole, the first magnetically hard material positioned proximal a tapered surface of the write pole and the second magnetically hard material positioned proximal a non-tapered surface of the write pole to bias the write pole with a bias field oriented parallel with the ABS.

2. The apparatus of claim 1, wherein a remnant magnetization is present in the write pole at the ABS immediately after powered operation.

3. The apparatus of claim 1, wherein the first magnetically hard material is separated from a shield positioned on the ABS by a third non-zero distance.

4. The apparatus of claim 1, wherein the write pole is disposed between first and second side laminations, the first side lamination comprising the first magnetically hard material and a first shielding layer, the second side lamination comprising the second hard magnetic material and a second shielding layer.

5. The apparatus of claim 4, wherein the tapered surface of the write pole having a first continuous taper angle with respect to the ABS, the first shield layer having a second continuous taper angle with respect to the ABS, the second shield layer having a third continuous taper angle with respect to the ABS, the second and third continuous taper angles each being greater than the first continuous taper angle.

6. The apparatus of claim 5, wherein the first, second and third continuous taper angles provide a write gap with increasing length along a downtrack direction.

7. The apparatus of claim 1, wherein the first magnetically hard material is placed in an uptrack position with respect to the write pole.

8. The apparatus of claim 7, wherein the first magnetically hard material is unshielded from the ABS.

9. The apparatus of claim 1, wherein the first magnetically hard material is positioned proximal to and separated from an assist wire.

10. The apparatus of claim 9, wherein the first magnetically hard material produces a substantially zero bias field on the write pole when the assist wire is unselected.

11. The apparatus of claim 1, wherein the second magnetically hard material is positioned on an opposite side of the write pole from the first magnetically hard material.

12. The apparatus of claim 1, wherein the second magnetically hard material is configured a third non-zero distance from the ABS, a fourth non-zero distance from the write pole, and a fifth non-zero distance from a trailing shield positioned on the ABS downtrack of the write pole.

13. An magnetic writing element comprising a first magnetically hard material separated from an air bearing surface (ABS) by a first non-zero distance and from a write pole by a second non-zero distance, a second magnetically hard material separated from the ABS, a trailing shield, first magnetically hard material, and write pole, the trailing shield disposed between the second magnetically hard material and the ABS, the first magnetically hard material positioned uptrack from the write pole and proximal a tapered surface of the write pole and the second magnetically hard material positioned downtrack from the write pole and proximal a non-tapered surface of the write pole to generate a bias field in the write pole distal the ABS, the bias field oriented parallel with the ABS.

14. The magnetic writing element of claim 13, wherein the bias field is substantially perpendicular to a programming write field in the write pole.

15. The magnetic writing element of claim 13, wherein the first magnetically hard material extends closer to the write pole than the second magnetically hard material.

16. The ma gnetic writing element of claim 13, wherein the bias field is generated in a trapezoidal region of the write pole distal to rectangular tip region of the write pole positioned on the ABS.

17. A method comprising:

separating a first magnetically hard material from an air bearing surface (ABS) by a first non-zero distance and from a write pole by a second non-zero distance;

positioning a second magnetically hard material separated from the ABS, first magnetically hard material, and write pole, the first magnetically hard material positioned proximal a tapered surface of the write pole and the second magnetically hard material positioned proximal a non-tapered surface of the write pole; and biasing the write pole with the first magnetically hard material to generate a bias field oriented parallel to the ABS.

18. The method of claim 17, wherein the first magnetically hard material produces a bias field substantially perpendicular to a programming write field in the write pole.

19. The method of claim 17, wherein the first magnetically hard material produces localized biased portions in the write pole.

* * * * *